United States Patent [19]

Weiss

[11] Patent Number: 5,080,480
[45] Date of Patent: Jan. 14, 1992

[54] MICROFILM MAP READER

[76] Inventor: Israel Weiss, 940 - 45th St., Lower Floor, Brooklyn, N.Y. 11219

[21] Appl. No.: 595,560

[22] Filed: Oct. 11, 1990

[51] Int. Cl.$^5$ .............................................. G03B 21/00
[52] U.S. Cl. ...................................... 353/12; 353/74; 353/119; 353/25
[58] Field of Search .................. 353/12, 11, 74, 76, 353/79, 105, 119, 13, 14, 122, 121, 25; 224/312

[56] References Cited

U.S. PATENT DOCUMENTS

| | | | |
|---|---|---|---|
| 1,572,671 | 2/1926 | Myers | 353/12 |
| 2,472,098 | 6/1949 | Duncan | 353/12 |
| 2,503,550 | 4/1950 | Good | 353/12 |
| 3,161,105 | 12/1964 | Offensend | 353/74 |
| 4,174,889 | 11/1975 | Peters | 353/12 |
| 4,240,722 | 12/1980 | Brecht | 353/12 |
| 4,312,577 | 1/1982 | Fitzgerald | 353/12 |
| 4,437,739 | 5/1984 | Haskin | 353/11 |
| 4,756,615 | 7/1988 | Hildebrand | 353/74 |
| 4,887,753 | 12/1989 | Allen | 224/312 |

FOREIGN PATENT DOCUMENTS 158211 6/1920 United Kingdom .................. 353/74

Primary Examiner—William A. Cuchlinski, Jr.
Assistant Examiner—William C. Dowling
Attorney, Agent, or Firm—Richard L. Miller

[57] ABSTRACT

A microfilm map reader is provided and consists of a housing removably attachable to a sun visor of a motor vehicle. A collapsible microfilm slide projector is built into the housing and has an translucent screen. A microfilm slide with a map thereon is insertable into the projector so that a person within the motor vehicle can read the map on the slide that is projected and enlarged onto the translucent screen.

6 Claims, 2 Drawing Sheets

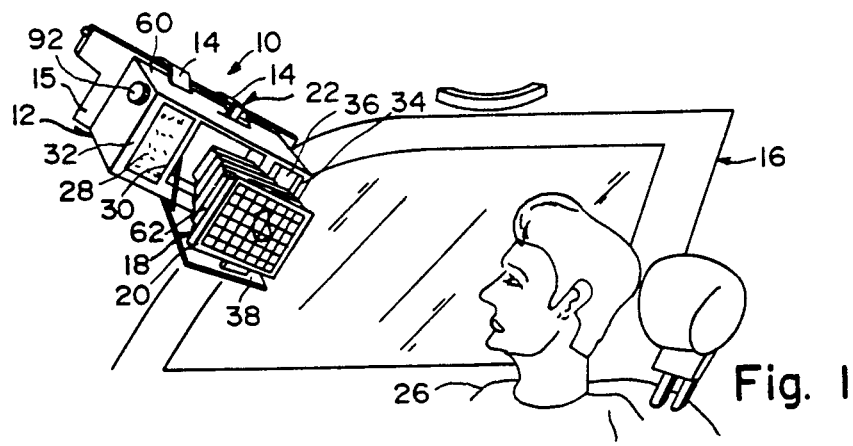
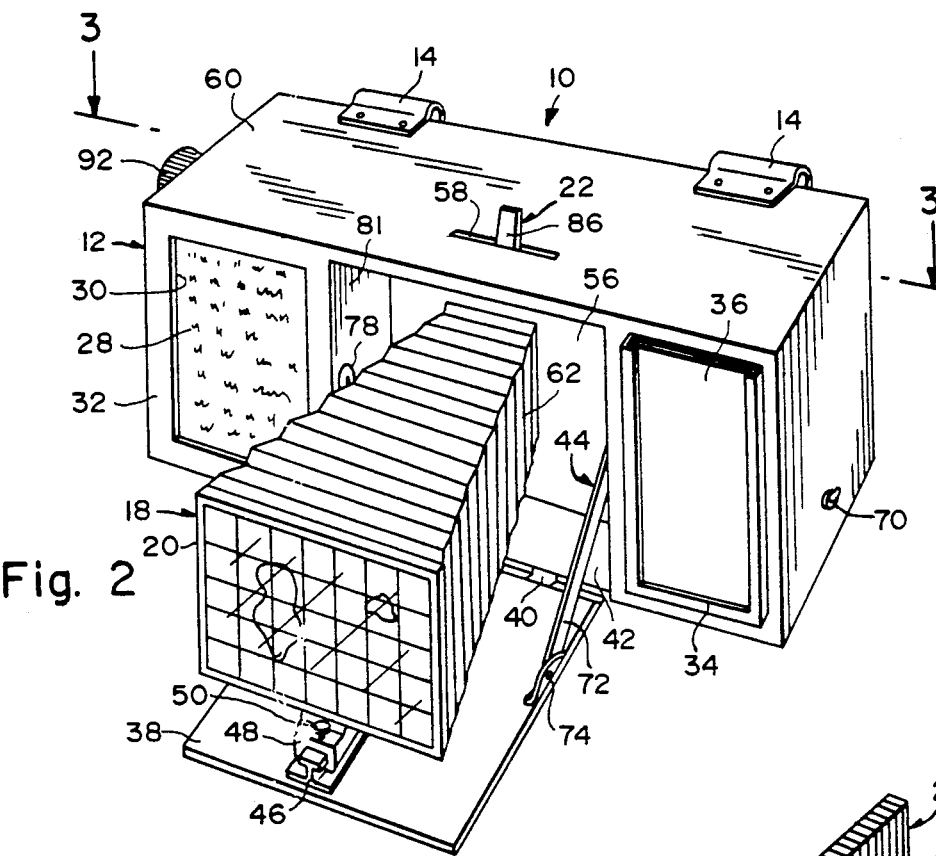
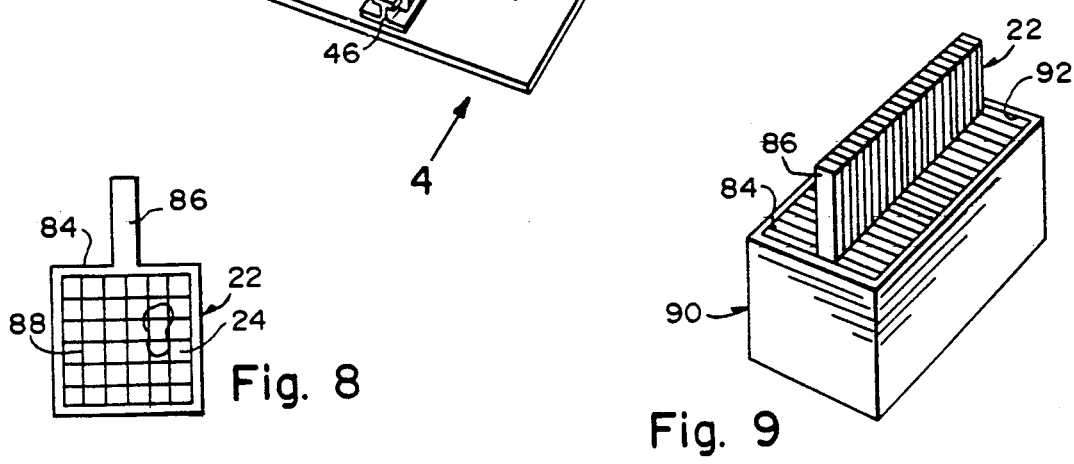

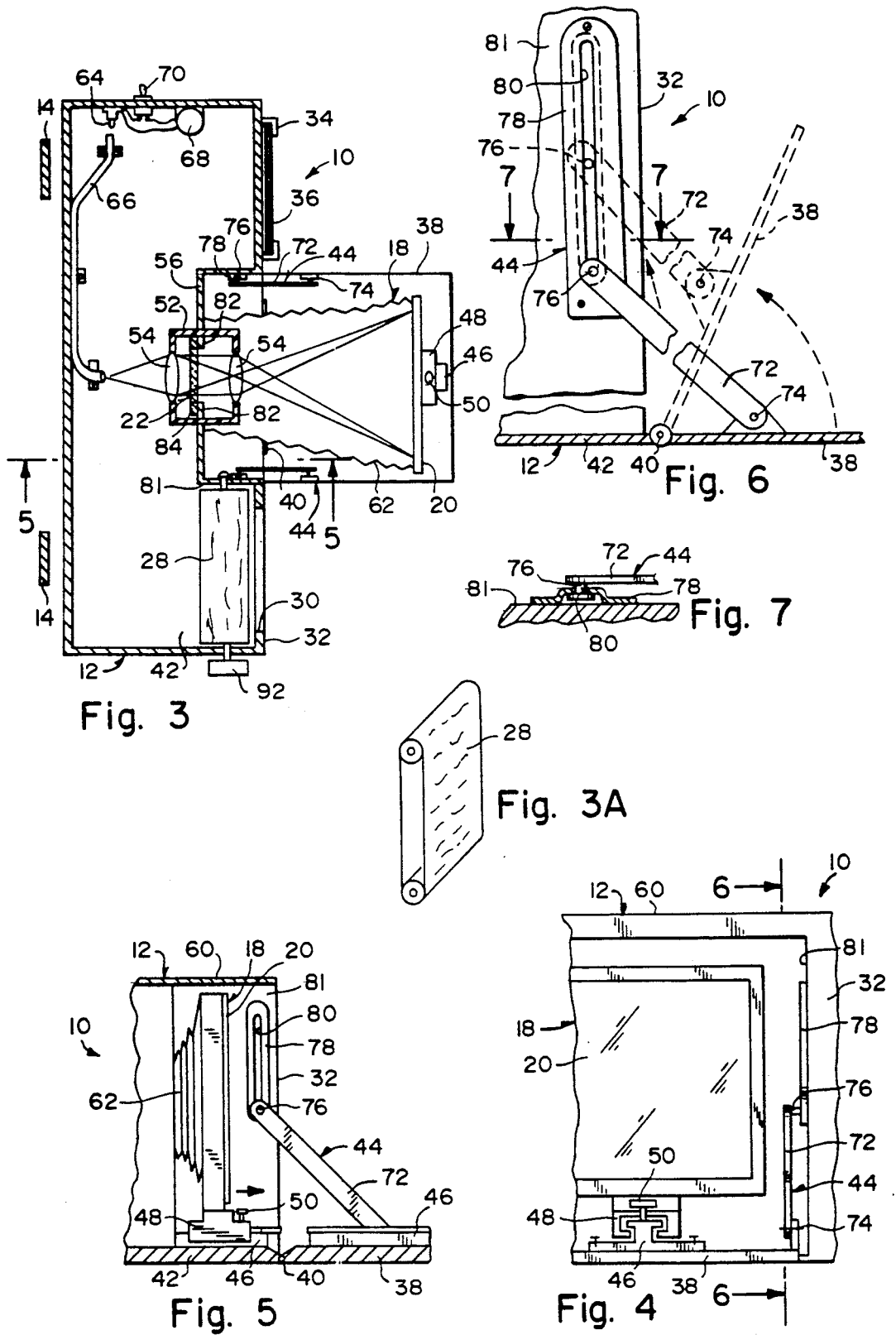

MICROFILM MAP READER

BACKGROUND OF THE INVENTION

The instant invention relates generally to slide projectors and more specifically it relates to a microfilm map reader.

Numerous slide projectors have been provided in the prior art that are adapted to project photographic slide images onto screens to be viewed therefrom by people. While these units may be suitable for the particular purpose to which they address, they would not be as suitable for the purpose of the present invention as hereafter described.

SUMMARY OF THE INVENTION

A primary object of the present invention is to provide a microfilm map reader that will overcome the shortcomings of the prior art devices.

Another object is to provide a microfilm map reader having a built-in collapsible microfilm slide projector, which may be clipped onto a sun visor of a motor vehicle, so that a person can read the map from a microfilm slide that is placed within the projector and displayed enlarged onto an translucent screen of the projector.

An additional object is to provide a microfilm map reader which will allow a person to have many maps printed on a plurality of microfilm slides that will fit onto a small container which can be carried in a glove compartment of the motor vehicle.

A further object is to provide a microfilm map reader that is simple and easy to use.

A still further object is to provide a microfilm map reader that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view illustrating the instant invention being used in a typical automotive vehicle;

FIG. 2 is a diagrammatic perspective view of the instant invention open and ready for use;

FIG. 3 is a diagrammatic cross sectional view taken on line 3—3 of FIG. 2;

FIG. 3A is a perspective view of the continuous reference index chart;

FIG. 4 is a front elevation view with parts broken away taken in the direction of arrow 4 in FIG. 2;

FIG. 5 is a diagrammatic cross sectional view of the instant invention but with the bellows collapsed, taken on line 5—5 of FIG. 3 with parts broken away;

FIG. 6 is an enlarged diagrammatic view taken on line 6—6 of FIG. 4 showing in greater detail some construction details;

FIG. 7 is a cross sectional view taken on line 7—7 of FIG. 6 with some parts broken away;

FIG. 8 is a diagrammatic perspective view of a typical microfilm slide ready to be inserted in the instant invention; and FIG. 9 is a perspective view of a container illustrating a number of microfilm slides stored therein.

DETAILED DESCRIPTION OF THE PREFERRED EMBODIMENTS

Turning now descriptively to the drawings, in which like reference characters denote like elements throughout the several views, the figures illustrate a microfilm map reader 10 consisting of a housing 12 and a pair of clips 14 on the housing 12 for removably attaching the housing 12 to a sun visor 15 in a motor vehicle 16. A collapsible microfilm slide projector 18 is built into the housing 12 and has an translucent screen 20. A plurality of microfilm slides 22 are provided having various maps 24 thereon. Each slide 22 is insertable into the projector 18 in the housing 12 so that a person 26 within the motor vehicle 16 can read the map 24 from the slide 22 that is projected and enlarged onto an translucent screen 20 of the projector 18.

A continuous reference index chart 28 is built into the housing 12 and can be seen through a window 30 in a front wall 32 at one slide of the projector 18, to help the person 26 identify indicia the map 24 on the slide 22 that is inserted within the projector 18. A U-shaped frame 34 to hold a writing pad 36 is built onto the front wall 32 of the housing 12 at the other side of the projector 18 so that the person 26 can write information upon the pad 36 when needed.

The projector 18 further includes a front door 38 hinged at 40 to the bottom wall 42 of the housing 12. A mechanism 44 is for retaining the front door 38 in a horizontal position when the front door 38 is opened. A track member 46 is on the interior surface of the front door 38 and the bottom wall 42 of the housing 12. A guide member 48 is on the bottom of the translucent screen 20 to ride on the track member 46, while a set screw 50 on the guide member 48 locks the guide member to the track member 46.

A focusing compartment 52 has a pair of spaced apart lenses 54 and is built into a rear wall 56 of the projector 18 within the housing 12. One microfilm slide 22 can be inserted through a slot 58 in a top wall 60 of the housing 12 between the lenses 54. A collapsible bellows 62 extends between the translucent screen 20 and the focusing compartment 52.

A lamp 64 is built into the housing 12, with a fiber optic tube 66 extending between the lamp 64 and the focusing compartment 52 to carry light from the lamp 64 to the lenses 54. A battery 68 in the housing 12 is electrically connected to the lamp 64. A switch 70 on the housing 12 is electrically connected between the lamp 64 and the battery 68 so as to turn the lamp 64 on and off.

The retaining mechanism 44 includes at least one arm 72 pivotally attached at one end 74 to the interior surface of the front door 38 at one side thereof, while a pin 76 is at the other end of the arm 72. A bracket 78 has an elongated slot 80 which is vertically attached to an interior surface of a slide wall 81 of the projector 18. The pine 76 on the arm 72 can ride within the slot 80 to hold the front door 38 in the horizontal position when the front door 38 is opened.

The focusing compartment 52 has magnetic contacts 82 therein. Each microfilm slide 22 has a magnetic frame 84 with a handle 86, which when inserted into the focusing compartment 52 will be attracted to the magnetic contacts 82 to hold the microfilm slide 22 stationary therein. Each microfilm slide 22 has a grid 88 printed over its respective map 24 which will allow the person 26 to locate a specific area thereon. A container 90 having an open top 92 is for storing the microfilm slides 22 therein.

To use the microfilm map reader 10 a person simply attaches the housing 12 via the clips 14 onto the sun visor 15 in the motor vehicle 16. The front door 38 is then opened and the opaque screen 20 pulled out and locked to the track member 46 by tightening the set screw 50. The switch 70 is then turned on to display the map 24 of the microfilm slide 22 that is inserted within the focusing compartment 52. The continuous indicia reference index chart 28 is turned by knob 92 to identify areas on the map 24 by the grid 88, while notes can be taken on the writing pad 36.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A microfilm map reader comprising:
   a) a housing;
   b) a pair of clips on said housing for removably attaching said housing to a sun visor in a motor vehicle;
   c) a collapsible microfilm slide projector built into said housing, said projector having an translucent screen;
   d) a plurality of microfilm slides having various maps thereon, each said slide insertable into said projector in said housing so that a person within the motor vehicle can read the map from said slide that is projected and enlarged onto the translucent screen of said projector;
   e) a continuous indicia reference index chart build into said housing and can be seen through a window in a front wall at one side of said projector, to help the person identify indicia on the map on said slide that is inserted within said projector; and
   f) a U-shaped frame to hold a writing pad built onto the front wall of said housing at the other side of said projector so that the person can write information upon said pad when needed.

2. A microfilm map reader as recited in claim 1, wherein said projector further includes:
   a) a front door hinged to a bottom wall of said housing;
   b) means for retaining said front door in a horizontal portion when said front door is opened;
   c) a track member on the interior surface of said front door and the bottom wall of said housing;
   d) a guide member on the bottom of the translucent screen to ride on said track member;
   e) a set screw on said guide member to lock said guide member to said track member;
   f) a focusing compartment having a pair of spaced apart lenses built into a rear wall of said projector within said housing, in which one said microfilm slide can be inserted through a slot in a top wall of said housing between the lenses;
   g) a collapsible bellows extending between the translucent screen and said focusing compartment;
   h) a lamp built into said housing;
   i) a fiber optic tube extending between said lamp and said focusing compartment to carry light from said lamp to the lenses;
   j) a battery in said housing electrically connected to said lamp; and
   k) a switch on said housing electrically connected between said lamp and said battery so as to turn said lamp on and off.

3. A microfilm map reader as recited in claim 2, wherein said retaining means includes:
   a) at least one arm pivotally attached at one end to the interior surface of said front door at one side thereof;
   b) a pin at the other end of said arm; and
   c) a bracket having an elongated slot which is vertically attached to an interior surface of a side wall of said projector so that said pin on said arm can ride within said slot to hold said front door in the horizontal position when said front door is opened.

4. A microfilm map reader as recited in claim 3, further including:
   a) said focusing compartment having magnetic contacts therein;
   b) each said microfilm side having a magnetic frame with a handle, which when inserted into said focusing compartment will be attracted to said magnetic contacts to hold said microfilm slide stationary therein.

5. A microfilm map reader as recited in claim 4, wherein each said microfilm slide includes a grid printed over its respective map which will allow the person to locate a specific area thereon.

6. A microfilm map reader as recited in claim 5, further including a container having an open top for storing said microfilm slides therein.

* * * * *